(12) United States Patent
Harris

(10) Patent No.: US 8,783,544 B2
(45) Date of Patent: Jul. 22, 2014

(54) BRAZING ALLOYS AND METHODS OF BRAZING

(71) Applicant: Joseph W. Harris, Cincinnati, OH (US)

(72) Inventor: Joseph W. Harris, Cincinnati, OH (US)

(*) Notice: Subject to any disclaimer, the term of this patent is extended or adjusted under 35 U.S.C. 154(b) by 0 days.

(21) Appl. No.: 13/836,654

(22) Filed: Mar. 15, 2013

(65) Prior Publication Data

US 2013/0248586 A1 Sep. 26, 2013

Related U.S. Application Data

(60) Provisional application No. 61/613,148, filed on Mar. 20, 2012, provisional application No. 61/693,486, filed on Aug. 27, 2012.

(51) Int. Cl.
*B23K 31/02* (2006.01)
*B23K 35/14* (2006.01)

(52) U.S. Cl.
USPC .......................... 228/56.3; 228/246; 228/902

(58) Field of Classification Search
None
See application file for complete search history.

(56) References Cited

U.S. PATENT DOCUMENTS

| | | | | |
|---|---|---|---|---|
| 1,829,903 A | * | 11/1931 | Leach | 420/497 |
| 1,904,360 A | * | 4/1933 | Dinkler et al. | 420/477 |
| 1,924,147 A | * | 8/1933 | Bates | 15/202 |
| 1,954,168 A | * | 4/1934 | Ellis | 428/544 |
| 2,040,055 A | * | 5/1936 | Lytle | 420/475 |
| RE20,638 E | * | 1/1938 | Leach | 420/504 |
| 2,121,194 A | * | 6/1938 | Hardy | 75/302 |
| 2,190,267 A | * | 2/1940 | Light | 228/244 |
| 2,235,634 A | * | 3/1941 | Hensel et al. | 420/502 |
| 2,274,863 A | * | 3/1942 | Leuser | 420/508 |
| 2,307,051 A | * | 1/1943 | Litton et al. | 428/676 |
| 2,319,539 A | * | 5/1943 | Dodd | 420/475 |
| 2,355,067 A | * | 8/1944 | Goldsmith | 420/483 |
| 2,376,581 A | * | 5/1945 | Dean | 420/504 |
| 2,984,903 A | * | 5/1961 | Dixon et al. | 228/234.1 |
| 3,322,547 A | * | 5/1967 | Quaas et al. | 75/255 |
| 4,448,851 A | * | 5/1984 | Bose et al. | 428/606 |

(Continued)

FOREIGN PATENT DOCUMENTS

| | | |
|---|---|---|
| JP | 56139642 | 10/1981 |
| RU | 2041783 C1 * | 8/1995 |
| WO | 2004018147 A1 | 3/2004 |

OTHER PUBLICATIONS

European Patent Office, International Search Report and Written Opinion of corresponding Application PCT/US2013/033085, dated Aug. 9, 2013, 11 pp.

*Primary Examiner* — Kiley Stoner
(74) *Attorney, Agent, or Firm* — Wood, Herron & Evans, LLP

(57) ABSTRACT

A brazing alloy is provided in the form of a wire, rod or preform, and is made of, in weight percent: 3-7.5% P, 0.1-1.9% Zn, 0-74.7% Ag, 0-80% Au, 0-10% Sn, 0-5% Ni, 0-3% each of Si, Mn, Li, and Ge, and the balance copper in an amount of at least 21.7%. In additional embodiments, Zn may be present in an amount of 0.6-1.9%. A method of torch brazing is also provided. The method includes forming the alloy into a wire or rod, placing the tip of the wire or rod in contact with a surface of a joint, heating the joint surface using a torch flame, and contacting the tip of the wire or rod to the heated joint surface to melt and flow the alloy onto the joint surface and into the joint under capillary action.

17 Claims, 1 Drawing Sheet

(56) References Cited

U.S. PATENT DOCUMENTS

| | | | |
|---|---|---|---|
| 4,448,852 A * | 5/1984 | Bose et al. | 428/606 |
| 4,497,430 A * | 2/1985 | Bose et al. | 228/262.61 |
| 4,549,687 A * | 10/1985 | Bose et al. | 228/262.61 |
| 6,202,703 B1 * | 3/2001 | Kuroda et al. | 138/178 |
| 6,268,079 B1 * | 7/2001 | Inoue et al. | 429/184 |
| 6,413,651 B1 * | 7/2002 | Yan et al. | 428/592 |
| 2003/0021717 A1 * | 1/2003 | Harris | 420/472 |
| 2003/0024969 A1 * | 2/2003 | Harris | 228/262.61 |
| 2003/0026724 A1 * | 2/2003 | Harris | 420/472 |
| 2005/0249629 A1 * | 11/2005 | Harris | 420/472 |
| 2006/0087340 A1 * | 4/2006 | Gupta | 326/33 |
| 2009/0087340 A1 | 4/2009 | Hartmann et al. | |
| 2011/0011920 A1 * | 1/2011 | Harris | 228/176 |
| 2011/0031301 A1 * | 2/2011 | Segletes et al. | 228/198 |
| 2011/0211988 A1 * | 9/2011 | Hasegawa et al. | 420/502 |
| 2013/0020378 A1 * | 1/2013 | Harris | 228/194 |

* cited by examiner

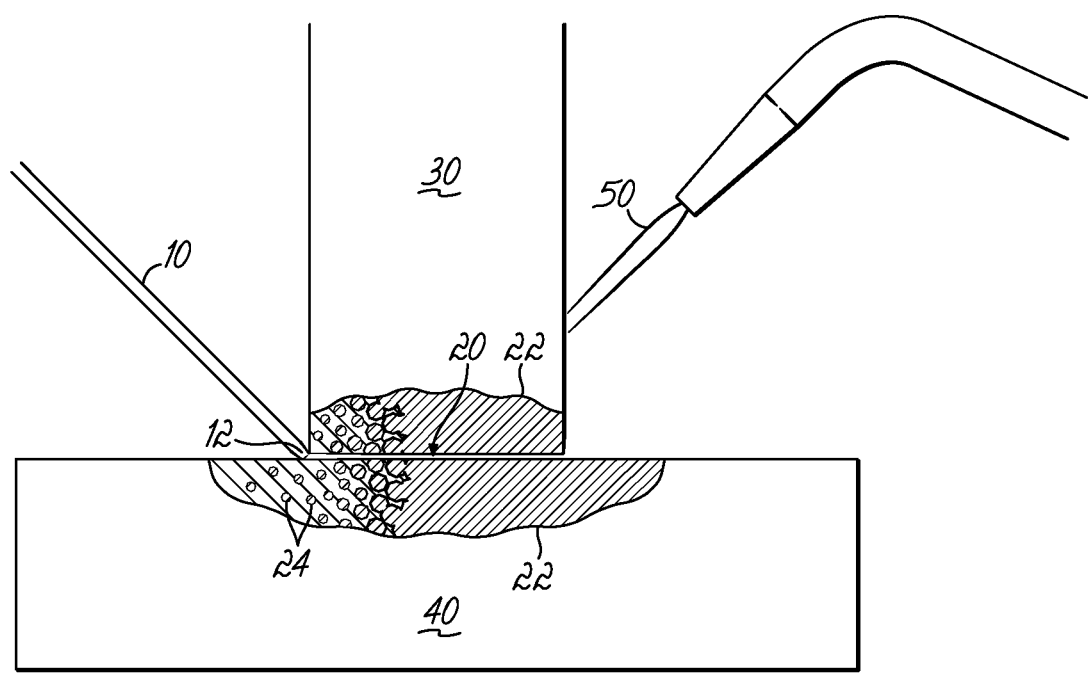

BRAZING ALLOYS AND METHODS OF BRAZING

CROSS-REFERENCE TO RELATED APPLICATIONS

Pursuant to 37 C.F.R. §1.78(a)(4), this application claims the benefit of and priority to prior filed Provisional Application Ser. No. 61/613,148 filed Mar. 20, 2012, and Provisional Application Ser. No. 61/693,486 filed Aug. 27, 2012, both of which are expressly incorporated herein by reference.

FIELD OF THE INVENTION

The invention relates to brazing alloys.

BACKGROUND OF INVENTION

Phosphorus-copper (phos-copper) and phosphorus-copper-silver (phos-copper-silver) alloys, identified by the American Welding Society (AWS) classification BCuP 1-9 brazing alloys (hereinafter "BCuP brazing alloys"), have been in wide use to join copper tubing and copper alloys together for over the past 70 years. Because these brazing alloys make strong ductile joints that resist vibration stresses, they are in wide use for the manufacture, installation and repair of air conditioning and refrigeration systems. Phosphorus and silver are used in the BCuP brazing alloys primarily to reduce brazing temperatures. The silver content typically ranges from 0% to 18% by weight, while the phosphorus content is typically 4-7.5%. Advantageously, phosphorus is limited to about 7.1 percent in the phos-copper alloys and about 6 percent in the phos-copper-silver alloys. Nickel, silicon and tin have also been added to the BCuP brazing alloys. When used to braze copper metal, the phosphorus in the BCuP brazing alloy is known to act as a fluxing agent, removing copper oxides sufficiently to effect wetting and brazing of copper. Because the phosphorus deoxidizes the copper surfaces, the BCuP brazing alloys are self-fluxing when brazing copper parts. Brasses and other copper alloys, however, require the use of adequate brazing fluxes. BCuP 1-9 brazing filler metals are not suitable to braze iron, cast iron, steels or other ferrous metals.

Carbon and low alloy steel, cast iron, stainless steel and nickel metals are generally brazed with AWS classification BAg 1-39 silver brazing filler metals. The BAg brazing alloys comprise silver, copper, zinc and may also include nickel and/or tin. The silver content ranges from 24-93% by weight, with 35-56% being most common. Zinc content ranges from 4-35% by weight, with 13-30% being most common. Torch brazing of ferrous metals requires the use of a brazing flux in the brazing process. Brazing fluxes remove oxides from ferrous metal surfaces to facilitate wetting of the ferrous metals, but become inactive at temperatures that exceed 1700° F. (927° C.). BAg-7 with 56% Ag, 17% Zn, 5% Sn and 22% Cu is exemplary, with a liquidus temperature of 1205° F. (652° C.) and a brazing temperature range of 1205-1400° F. (652-760° C.). Without consideration for cadmium bearing, toxic BAg 1, 1a, 2, 2a, and the like, silver brazing filler metals, BAg 7 is believed to be the most highly used silver brazing filler metal in the western world. It is not favored by its costly 56% content of silver, but by its lowest liquidus temperature of 1205° F. (652° C.). BAg-7 has the largest range of temperature between the start of becoming molten, and the higher temperature that causes the brazing flux to burn sufficiently to halt the flow of the molten silver brazing filler metal. Increasing silver content over 56%, in silver brazing filler metals, causes the liquidus to rise above the temperature of BAg-7.

The BCuP brazing alloys have only been considered suitable for brazing copper or copper alloys to copper or copper alloys. On the other hand, the BAg brazing alloys have been considered suitable for brazing a wide variety of base metals, to both like base metals and different base metals. For example, BAg brazing alloys can be used to braze a cast iron base metal to another base metal of cast iron, copper, copper alloys, nickel, nickel alloys, stainless steel, or carbon or low alloy steels.

There is a small, but general consensus in the brazing industry that the reason the BCuP brazing alloys will not braze steels is that phosphorus, contained in the braze alloy, causes the braze area to become brittle.

The present inventor does not concur with that opinion and finds that the entire range or group of BCuP brazing alloys do braze ferrous and non ferrous metals together. The confusion arises from the fact that the viewer of a live braze sees the molten braze alloy lose some of its surface tension and flow, by apparent capillary action, into the capillary area to fill and complete the braze. But when tested, the brazed parts are separated with an audible snap, and deemed brittle. However, phosphorus, when added to copper and silver in amounts up to 7.5%, the highest percentage contained in the BCuP brazing alloy group, reduces ductility, but not sufficiently to cause the brazed joint area to become brittle.

Generally, phosphorus is limited to about 7.5% in both the non silver bearing BCuP brazing alloys and the silver bearing BCuP brazing alloys. The BCuP brazing alloys, as cast and worked into finished new unused brazing wires are ductile and are not considered to be brittle. For example, testing of annealed 7.1% phos copper wire, BCuP 2, worked to a 36% reduction in size, resulted in a 75% hardness condition. A BCuP 5 wire of 5% phosphorus, 15% silver and 80% copper, annealed and worked to a 42% reduction in size caused the finished wire to become half hard. Both wires were springy and not overworked. After brazing steels and dissimilar metals with BCuP brazing alloys, the brazing alloy area of the brazed joint is fully annealed by the heat of the brazing process and is ductile. It is therefore believed that the failure of the brazed joint is due to a reason other than brittleness.

There is thus a need to identify the real cause of braze failure of the BCuP brazing alloys or other similar alloys when brazing metals other than copper, and to then enable an expansion of the use of BCuP brazing alloys and other similar alloys to other brazing applications.

SUMMARY OF THE INVENTION

In accordance with an embodiment of the invention, a brazing alloy is provided in the form of a wire, rod or preform, comprising or consisting essentially of, in weight percent: 3-7.5% P, 0.1-1.9% Zn, 0-74.7% Ag, 0-80% Au, 0-10% Sn, 0-5% Ni, 0-3% each of Si, Mn, Li, and Ge, and the balance copper in an amount of at least 21.7%. In additional embodiments, Zn may be present in an amount of 0.6-1.9%.

In accordance with an embodiment of the invention, a method of torch brazing is provided. The method includes forming a wire or rod from an alloy comprising, in weight percent: 3-7.5% P, 0.6-1.9% Zn, 0-74.7% Ag, 0-80% Au, 0-10% Sn, 0-5% Ni, and the balance copper in an amount of at least 21.7%. The tip of the wire or rod is then placed in contact with a surface of a joint formed by first and second base metals, wherein the first base metal is a ferrous alloy, nickel, a nickel alloy, gold, a gold alloy, silver or a silver alloy, and wherein the second base metal is a ferrous alloy, nickel, a nickel alloy, gold, a gold alloy, silver, a silver alloy, copper, or a copper alloy. The method further includes heating the joint surface using a torch flame and contacting the tip of the wire or rod to the heated joint surface to melt and flow the alloy onto the joint surface and into the joint under capillary action.

In accordance with another embodiment of the invention, a method of brazing is provided. The method includes forming a preform from an alloy comprising, in weight percent: 3-7.5% P, 0.1-1.9% Zn, 0-74.7% Ag, 0-80% Au, 0-10% Sn, 0-5% Ni, and the balance copper in an amount of at least 21.7%. The preform is then placed in contact with the surfaces of a joint formed by first and second base metals, wherein the first base metal is a ferrous alloy, nickel, a nickel alloy, gold, a gold alloy, silver or a silver alloy, and wherein the second base metal is a ferrous alloy, nickel, a nickel alloy, gold, a gold alloy, silver, a silver alloy, copper, or a copper alloy. The method further includes heating the joint surface to melt and flow the alloy into the joint.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

The FIGURE is a schematic cross-sectional view depicting a method of torch brazing in accordance with an embodiment of the invention.

DETAILED DESCRIPTION

Without being bound by theory, it is believed that the BCuP brazing alloys, with suitable fluxes, are unable to penetrate and remove the steel oxide surfaces to enable the brazing alloy to wet the surfaces, and form sound brazes. As explained above, the viewer of a live braze sees the molten braze alloy lose some of its surface tension and flow into the capillary area to fill and appear to complete the braze. However, in actuality, the braze is only partial, not complete, and thus has little strength. The real problem with the BCuP brazing alloys being used to braze steels with the use of a flux is that the steel oxides are not sufficiently removed to allow substantial wetting and brazing to occur, and thus a braze is formed that is subject to failure not because it's brittle, but because it's not complete. Thus, BCuP brazing alloys have been limited to brazing applications where the base metals are both copper or copper alloys where the brazing filler metal is able to fully wet the surface and form a complete braze.

The state of the art does not recommend or acknowledge that BCuP brazing alloys or the like have the ability to braze or sufficiently wet ferrous and/or nickel metals and alloys as set forth above. Phosphorus, contained in the BCuP brazing alloys, wets and permits the brazing process to proceed for copper and its alloys, but does not sufficiently wet ferrous and nickel metals and alloys. Thus, the silver solders are used instead. This disclosure identifies a method of brazing ferrous and nickel metals and alloys using a modification to the BCuP-type brazing alloys that enable their use with these other metals and alloy systems. The alloy used in the present invention is thus referred to as a "modified BCuP brazing alloy" or "modified brazing alloy." The modified brazing alloy of the present invention is essentially a phos-copper brazing alloy and a silver solder all in one, as it exhibits the benefits of both classes of alloys.

To that end, 0.6 to 1.9% zinc is added to a BCuP brazing alloy or the like to be used as brazing wire or rod, which allows the modified brazing alloy to wet and braze ferrous or nickel metals and alloys in an advantageous way similar to silver solders. All percents provided herein are weight percent unless stated otherwise. Strength and ductility are adequate for most applications, and the modified brazing alloys flow well and provide smooth fillets. The addition of 0.6-1.9% zinc does not materially affect the ability of the modified brazing alloys to braze copper and copper alloys, such that it's standard use with copper and copper alloys is unaffected, but the modified brazing alloys now have expanded use with ferrous and nickel metal and alloy systems, and thus can be used in place of traditional silver solders.

In one embodiment, zinc is added in an amount of 0.6% or greater, for example, 0.8% or greater, and by further example, 0.9% or greater, and in an amount of 1.9% or less, for example, 1.6% or less, and by further example, 1.4% or less. In another embodiment, zinc is added in an amount of 0.9 to 1.8%. In addition, phosphorus is present in amounts greater than 4%, for example 5% or greater, and in an amount of 7.5% or less, for example 6.5% or less. The combination of phosphorus and zinc in these amounts in a copper-based brazing alloy produces a brazing alloy that behaves as both a phos-copper alloy and a silver solder in one.

In addition to allowing the modified brazing alloy to sufficiently wet the surface of ferrous and nickel metals/alloys, zinc addition also lowers the brazing temperatures of the modified brazing alloys to a small degree, and can also be utilized in advantageous ways such as reducing the amounts of silver or copper required to make specific brazes. An advantage of phosphorus in the phos-copper alloys is temperature reduction; for example, adding 5% phosphorus to copper can lower the brazing temperature by 500° F. In BAg silver solders, silver is present typically around 50% to achieve sufficiently low brazing temperatures that avoid burning the brazing flux. Zinc, on the other hand, in an amount of 0.6-1.9% may be expected to impart only a ten degree reduction in temperature, and thus its addition is not, by itself, a particularly effective means of lowering the brazing temperature. However, because the small addition of zinc to a phos-copper alloy containing a small amount (3-7.5%) of phosphorus enables the use of the phos-copper alloy for brazing ferrous and nickel metals/alloys, and phosphorus in a small amount achieves a large temperature reduction, less silver or even no silver may be used to provide a modified brazing alloy with comparable brazing temperatures to the BAg silver solders but at a fraction of the cost. Benefits of the zinc addition may thus include lower costs for brazing metals, production costs of fuel and manufacturing time. Unlike when brazing copper and copper alloys, the use of the modified brazing alloys will require the use of suitable brazing fluxes or inert protective gas atmospheres to be successful with brazing ferrous metals to their like and to non ferrous metals. Certain stainless steels and tool steels require special treatment before being brazed with the BAg silver solders, as known to persons ordinarily skilled in the art of brazing, and the same treatments will be needed with the modified brazing alloys of the invention when brazing these materials.

The modified brazing alloys of the invention may be used in torch brazing methods using the form of wire or rod. When zinc is added to modify BCuP brazing alloys in a content exceeding 2%, it is very difficult to braze effectively because the zinc presence in the modified alloy causes heavy oxidation to form on the surface of the tip of the wire or rod as it is extracted from the molten brazing pool during the brazing procedure and contacted by oxygen in the air. For example, a previously unused or virgin BCuP brazing rod of 3/32" diameter, modified to contain 2% or more zinc in the brazing alloy composition, will melt and braze upon initial contact with the heated metal surface, such as a cast iron surface. However, as the brazing rod is retracted from the molten braze pool, the used end of the rod that was heated to a near molten condition cools and becomes oxidized by contact with oxygen in the air. When this same rod end that has become oxidized is again offered to resume brazing, the tenacious oxide will resist melting on contact even with sufficient heating, and the rod or wire will not freely braze. The flow of the brazing process is harmfully disturbed and cannot be resumed favorably. This interruption to the process would not be generally acceptable. Thus, the modified brazing alloys of the invention contain less than 2% zinc, which allows for repeated brazing from a single brazing wire or rod.

This tenacious oxide problem would not occur if the modified brazing rod is flux coated, as the brazing flux would prevent the rod from becoming oxidized from contact with oxygen contained in the air. Higher zinc percentages in preforms of the brazing alloy could be employed, as brazing preforms are a single brazing product. Preforms are used in one braze operation, where the whole part becomes molten and is consumed. After brazing, should the remaining brazed solidified area be oxidized from contact with oxygen contained in air, the brazed area would suffer no negative effect. Thus, the effect of zinc content of over 1.9% in the brazing alloy that might cause a rod or wire to become damaged is not germane to preforms. Additional amounts of zinc in excess of 1.9% may be included in the brazing preform to lower brazing temperatures and reduce brazing alloy metal costs. Greater zinc additions are to be researched further before limits can be established, but limits of above 1.9% are feasible for preforms.

Thus, while the present invention is particularly advantageous for wires and rods, where repeated brazing using a single wire or rod is enabled by the invention, the modified brazing alloys of the invention may also be used with other forms of the brazing alloy, such as preforms, powders, or brazing pastes. For example, a brazing ring made of the modified brazing alloy may be used for a single braze operation to join a ferrous or nickel metal/alloy part to another part of ferrous, nickel or copper metal/alloy. The preforms will braze with the advantageous lower brazing temperature of the modified brazing alloys similar to the temperatures that can be achieved with silver solders, but the preforms will cost a fraction to manufacture and use.

In accordance with the invention, the addition of about 0.6-1.9% zinc, for example, about 0.8-1.6% zinc, to a standard BCuP brazing alloy or the like will allow this class of alloy or similar alloys to braze the following metals to themselves, to each other, and to their alloys: silver and silver alloys, carbon and low alloy steel, cast iron, stainless steel, nickel and nickel alloys, gold and gold alloys, and tool steels or their like. While zinc in amounts exceeding 2 or more percent added to the BCuP brazing alloys in the form of rod or wire impede the ability of these alloys to ideally braze various metals, the addition of about 0.6-1.9% zinc provides a service, a metallurgical change, in addition to zinc's ability to lower the brazing temperatures of some brazing alloys. Phoscopper and phos-copper-silver alloys containing zinc in an amount less than 2% wet the surface of the ferrous and nickel or silver base metals listed above. An oxide layer may be present on the base metal surface, which normally cannot be penetrated by a standard BCuP brazing alloy, with or without brazing flux, or other similar alloy. Without being bound by theory, the small zinc addition according to the invention can break through that oxide allowing the modified brazing alloy to sufficiently wet the surface. As the base metals are wetted, brazing occurs simultaneously. Resulting brazes are strong, ductile, complete and occur at advantageous temperatures.

It is difficult to put an exact lower limit on the amount of zinc that is necessary to remove oxides on the surfaces of steels. It is fair to say that additional brazing may occur with zinc additives of less than 0.5% when brazing with the BCuP modified brazing alloys. In factory controlled conditions, a more exacting zinc percentage could be established. But generally, 0.6% is a relatively safe lower limit to ensure that the modified brazing alloy breaks through the oxide and wets the surface, and 0.8% is an even safer and reliable lower limit. In the broadest sense, the alloy of the invention contains an intentional addition of zinc in some amount that is sufficient to allow the brazing alloy to break through the oxide, wet the surface and form a complete braze, with that amount being less than 2% and greater than zero. While routine experimentation may determine an exact lower limit for the zinc addition in a given metal or alloy system, 0.6-1.9% may be used with reasonable certainty of obtaining the advantages of the invention, and advantageously, 0.8-1.9% zinc is used for even greater certainty.

Embodiments of modified brazing alloys of the invention for use in wire or rod form have a composition comprising or consisting essentially of the elements in ranges set forth in Table 1 below:

TABLE 1

Element Composition Range - Modified Brazing Alloys

| Element | Maximum Content (wt. %) | Minimum Content (wt. %) |
|---|---|---|
| Silver (Ag) | 74.7 | 0 |
| Gold | 80 | 0 |
| Copper (Cu) | Balance | 21.7 |
| Phosphorus (P) | 8.0 | 3 |
| Tin (Sn) | 10 | 0 |
| Nickel (Ni) | 5 | 0 |
| Zinc (Zn) | 1.9 | 0.1 |
| Germanium (Ge) and/or Lithium (Li) | 3, each | 0 |
| Manganese (Mn) and/or Silicon (Si) | 3, each | 0 |

Active elements germanium and lithium may be added to these formulas to further enhance wetting and brazing alloy strength. A portion of the tin (Sn) may also be substituted with antimony (Sb), for example up to 4%, and manganese and/or silicon are optional additions in amounts up to 3%. Gold may be present, up to 80%, for example 20-80%. Impurities may be present by virtue of the raw materials used to make the alloys, and are to be distinguished from elements intentionally added to the alloy melt for the purpose of affecting the properties of the alloy.

Examples of modified brazing alloys with zinc added for brazing silver, carbon and low alloy steel, cast iron, stainless steel, copper, brasses, gold, and nickel to themselves, to each other, and to their alloys, are provided below in Table 2:

TABLE 2

Examples of Modified Brazing Alloys

| | Ag | Cu | P | Sn | Ni | Zn | Liquidus | B.P.** | Solidus |
|---|---|---|---|---|---|---|---|---|---|
| Example 1 | 5.5 | 77.7 | 6.4 | 6.2 | 3.0 | 1.2 | 1382 | | 1027 |
| Example 2* | 5.5 | 77.1 | 5 | 6.9 | 2 | 1 | 1342 | 1162 | 1096 |
| Example 3 | 14.5 | 73.3 | 5 | 5 | 1 | 1.2 | 1320 | 1136 | 1051 |
| Example 4 | 0 | 85 | 6 | 6 | 2 | 1 | 1421 | 1211 | 1090 |

TABLE 2-continued

Examples of Modified Brazing Alloys

| | Ag | Cu | P | Sn | Ni | Zn | Liq-uidus | B.P.** | Solidus |
|---|---|---|---|---|---|---|---|---|---|
| Example 5 | 5.5 | 83.3 | 5 | 5.4 | 0 | 0.8 | 1449 | — | 1201 |
| Example 6 | 14.5 | 79.7 | 5 | 0 | 0 | 0.8 | 1465 | — | 1190 |

*Further contains 1.5% Ge and 1% Li.
**Break Point: refers to a point on the cooling curve that indicates a temperature of momentary equilibrium, and closely indicates the temperature at which the brazing alloy will become liquid enough to flow by capillary action.

The alloys of Examples 1-6 are similar to BCuP alloys in composition, but the addition of zinc enabled the alloys to successfully braze ferrous and non-ferrous base metals similar to a silver solder.

In other exemplary embodiments, modified brazing alloys of the invention that are phos-copper/phos-copper-silver alloys and silver solders in one have a composition comprising or consisting essentially of the elements in ranges set forth in Table 3 below:

TABLE 3

Element Composition Range - Exemplary Modified Brazing Alloys

| Element % | Maximum Content | Minimum Content |
|---|---|---|
| Silver (Ag) | 30 | 0 |
| Copper (Cu) | Balance | 54.4 |
| Phosphorus (P) | 7.5 | 3 |
| Tin (Sn) | 10 | 0 |
| Nickel (Ni) | 5 | 0 |
| Zinc (Zn) | 1.9 | 0.6 |

In a further embodiment of a silver-bearing modified brazing alloy, the silver content is at least 1%, for example, at least 5%, and is less than 30%, for example 18% or less.

As discussed above, it is believed that the BCuP brazing alloys only partially wet and braze fluxed steels when torch brazed, and the resulting brazes are not sufficiently, or dependably, strong enough for many applications. The BCuP brazing alloys do not adequately wet the steel to permit a strong metallurgical connection, and for this reason, BCuP brazing alloys are not used or considered qualified to braze steel base metals. Conversely, in accordance with the invention, the addition of less than 2% zinc to the BCuP brazing alloys allows the modified brazing alloys to more completely, and adequately, eliminate the steel oxides present on the surface of steel base metals, to wet the steels and to form adequately strong brazes. This difference in strength can be shown by tensile testing the brazes.

To that end, tensile strength tests were conducted comparing qualifying American Welding Society (AWS) Class BCuP-5, -4, -3 and -2 brazing alloys, identified as Comparative Examples 1-4, with modified brazing alloys of a similar composition that were modified only by the addition of 1.6% of zinc, identified as Examples 7-10. The modified brazing alloys are further identified as BCuP-5, -4, -3, and -2-MODIFIED. The amount of copper in the BCuP brazing alloys is adjusted, proportionally, to accommodate the inclusion of 1.6% zinc in the modified brazing alloys.

The tensile testing was conducted using a tensile testing machine Model TP, manufactured by the Detroit Testing Machine Manufacturing Co. (Detroit Mich.). All tests were performed using strips of 1018 mild steel, size 0.050 inch thickness by 0.5 inch width by 2.5 inches in length as the base metal parts. Each brazed assembly for testing is made up from two base metal parts, both fluxed with an appropriate brazing flux. The base metal parts overlapped so that the joint area was 0.5 inch in length and 0.5 inch in width. Both base metal parts were placed in a fixture that allowed the fluxed parts to lie flat, allowing the brazed joint area to be uniform in thickness, about 0.002 inch-0.004 inch. The void area created was then filled with molten brazing alloy, by capillary action, as it was torch brazed.

After each braze was made with an oxy-acetylene torch and air cooled, the brazed assembly was placed in the tensile testing machine, with each end of the brazed part tightly secured mechanically. Each end of the brazed part was then pulled away from the centered braze area, until a complete fracture occurred in the braze area, or until the base metal sheared apart. The results are provided in Table 4.

Results of the comparative tensile strength tests show considerable brazing strength improvements for the BCuP-2, -3, -4, and -5 brazing alloys that were modified with the addition of 1.6% zinc (Examples 7-10), over the brazing alloys that were not modified (Comparative Examples 1-4). The zinc modification to the BCuP brazing alloys allows positive brazing results that are similar or equal to the ability of most the of AWS BAg Class 1-39 brazing alloys used for torch brazing steels and stainless steels.

TABLE 4

Comparative Examples v. Examples of Invention

| Example # AWS CLASS | Ag | P | Cu | Zn | PSI TENSILE STRENGTH | LIQUIDUS C.° | F.° | NOTES |
|---|---|---|---|---|---|---|---|---|
| Comparative Example 1 - AWS BCuP-5 | 15 | 5 | 80 | — | 18,392 | 802 | 1,475 | |
| Example 7 - BCuP-5 MODIFIED | 15 | 5 | 78.4 | 1.6 | 47,857 | * | * | HEAVILY ELONGATED BASE METAL |
| Comparative Example 2 - AWS BCuP-4 | 6 | 7.1 | 86.9 | — | 26,458 | 718 | 1,325 | |
| Example 8 - BCuP-4 MODIFIED | 6 | 7.1 | 85.3 | 1.6 | 47,589 | * | * | BROKE IN BASE METAL |
| Comparative Example 3 - AWS BCuP-3 | 5 | 6 | 89 | — | 21,980 | 813 | 1,495 | |

TABLE 4-continued

Comparative Examples v. Examples of Invention

| Example # AWS CLASS | Ag | P | Cu | Zn | PSI TENSILE STRENGTH | LIQUIDUS C.° | LIQUIDUS F.° | NOTES |
|---|---|---|---|---|---|---|---|---|
| Example 9 - BCuP-3 MODIFIED | 5 | 6 | 87.4 | 1.6 | 47,500 | * | * | BROKE IN BASE METAL |
| Comparative Example 4 - AWS BCuP-2 | 0 | 7.1 | 92.9 | — | 23,035 | 793 | 1,480 | |
| Example 10 - BCuP-2 MODIFIED | 0 | 7.1 | 91.3 | 1.6 | 44,928 | * | * | BROKE IN BASE METAL |

* Nominal temperature change

Additional examples of modified brazing alloys of the invention are provided in Table 5, showing the effect on tensile strength and liquidus temperature of varying the amount of the zinc addition.

TABLE 5

Additional Example of Invention

| Example # AWS CLASS | Ag | P | Cu | Zn | Sn Ni | PSI TENSILE STRENGTH | LIQUIDUS C.° | LIQUIDUS F.° | NOTES |
|---|---|---|---|---|---|---|---|---|---|
| Example 11 | 6.8 | 7.3 | 84.1 | 1.8 | | 47,142 | 673 | 1,299 | 0.5" BASE METAL ELONGATION |
| Example 12 | 6 | 7.1 | 85.3 | 1.6 | | 44,529 | 735 | 1,355 | SHEARED IN BASE METAL |
| Example 13 | 5.5 | 5 | 79.2 | 1.4 | 6.9 2 | 38,214 | 725 | 1,334 | |
| Example 14 - BCuP-3 MODIFIED | 5.5 | 5 | 83.3 | 0.8 | 5.4 | 51,428 | 787 | 1449 | |
| Example 15 - BCuP-5 MODIFIED | 14.5 | 5 | 79.7 | 0.8 | — | 52,142 | 796 | 1465 | |

When the alloys of this invention contain from 5-18% silver, brazing tensile strengths decline when zinc content exceeds about 1%. Increasing amounts of zinc over 1% and up to 1.9% percent, results in weaker strengths of brazing connections, by as much as 20-30%, however, the lowered strength may be acceptable for some applications. Maintaining 0.7-1% zinc, for example 0.8-0.9%, achieves maximum tensile strength when brazing as a silver brazing filler metal.

Tin, when added to the alloys of this invention in amounts of 0.5-10.0%, for example 2-7%, has the synergistic effect of dramatically reducing the heavy black oxide that forms on the surface of copper metals during brazing. The bright braze that results is more visible for inspection. Balanced with zinc at the lower end of the inventive range, i.e., 0.6-1%, for example 0.8% as shown in Example 14, the high tensile strength is maintained.

A minimum amount of zinc is required in the modified brazing alloys to remove sufficient steel oxides from the surfaces of the steel parts to be brazed. Tests have shown that steel oxide is removed somewhat in proportion to the amount of zinc added, and can cause the affected steel surfaces to react favorably with the addition of about 0.5% zinc. However, results at this level of zinc prove to be inconsistent, and at the level of about 0.6% zinc, results become more consistently positive. Good results in the brazing of steels, with the modified brazing alloys of the invention or AWS BAg Class 1-39 silver brazing alloys, require significant art in preparation, including cleaning of all foreign surface contaminants, abrading the surface areas and maintaining tight dimensional control of the capillary areas that are to be filled by the molten brazing alloys.

Tensile strength numbers indicate that light brazing takes place when the AWS BCuP-2, -3, -4, and -5 brazing alloys are brazed with brazing fluxes employed in the process. Testing further showed that brazing strengths improve in the modified brazing alloys with the addition of 0.1% of zinc and continue to improve with additional amounts of zinc to about 0.8%, where results become more uniform to become relied upon. As shown with Examples 14 and 15, excellent tensile strengths can be attained by employing 0.8% zinc. A lesser amount of zinc may be used if strict art is maintained throughout the brazing process. This is relevant for most torch brazing silver filler metals. Advantages in using higher amounts of zinc include greater assurance of removal of steel oxides, lower costs of the brazing filler metal due to the low cost of zinc, and a lowering of the liquidus brazing temperature. The increase of zinc to 1.9% does not result in any negative changes to the brazed alloy area.

Thus, in its broadest form, the alloys of the invention contain 0.1-1.9% zinc. For amounts of 0.1-0.5% zinc, strength improvements will be observed generally, although strict art must be maintained throughout the brazing process, as discussed above. There may be some inconsistency observed in this range, particularly if the brazing surfaces are not properly prepared, although with proper preparation the advantages of the invention are generally observed. For amounts of 0.6-1.9%, the strength improvement will be more pronounced, and more consistently obtained. Proper surface preparation is still required, though not as strictly. Additions of 0.6-0.9% zinc mark a transition from less reliable to more reliable strength improvement results. Thus, 0.1-1.9% zinc addition is contemplated, with 0.6-1.9% zinc addition being more advantageous toward consistent results, and 0.8-1.9% zinc addition being most advantageous toward consistent results.

According to one embodiment, and with reference to the FIGURE, a method is provided for torch brazing using a modified brazing alloy of the invention. To that end, a wire or rod 10 is formed from an alloy comprising or consisting essentially of, in weight percent: 4-7.5% P, 0.6-1.9% Zn, 0-73.7% Ag, 0-80% Au, 0-10% Sn, 0-5% Ni, 0-3% each of Si, Mn, Li, and Ge, and the balance copper in an amount of at least 21.7%. The tip 12 of the wire or rod 10 is placed in contact with a surface of a joint 20 formed by two base metals 30, 40, where one base metal 30 is a ferrous alloy, nickel, a nickel alloy, gold, a gold alloy, silver or a silver alloy, and the other base metal 40 is a ferrous alloy, nickel, a nickel alloy, gold, a gold alloy, silver, a silver alloy, copper or a copper alloy. Flux is also used in the joint 20. The fluxed joint 20 is heated with the torch flame 50 by heating the base metals in an area surrounding the joint area 22 to heat the joint area 22 by conduction. When the joint area 22 is sufficiently hot, the brazing alloy melts by contact of the tip 12 of the wire or rod 10 onto the hot surface at the joint 20, i.e., by contact with the base metals in the joint area 22, allowing the molten brazing alloy to flow into the joint 20 under capillary action. The addition of the small amount of zinc in the braze alloy breaks through the oxides 24 that have formed on the surfaces in the joint area 22, permitting the surfaces of the joint 20 to be wetted and brazed. In a further embodiment, the heat of the brazing torch 50 is removed from the base metals, and then the process is repeated at the same or different joint 20. When the brazing wire or rod 10 is withdrawn from the heated joint area 22, the small amount of zinc on the surface of the wire or rod 10 will not cause the formation of oxides on the tip 12 that would interfere with additional brazing using the wire or rod 10.

According to one embodiment of the invention, a brazing alloy is provided in the form of a wire, rod or preform, comprising, in weight percent: 3-7.5% P, 0.1-1.9% Zn, 0-74.2% Ag, 0-80% Au, 0-10% Sn, 0-5% Ni, and the balance copper in an amount of at least 21.7%.

According to one embodiment of the invention, a brazing alloy is provided in the form of a wire or rod, comprising, in weight percent: 3-7.5% P, 0.6-1.9% Zn, 0-74.7% Ag, 0-10% Sn, 0-5% Ni, and the balance copper in an amount of at least 21.7%.

According to one embodiment of the invention, a brazing alloy is provided in the form of a wire or rod, consisting essentially of, in weight percent: 3-7.5% P, 0.6-1.9% Zn, 0-74.7% Ag, 0-80% Au, 0-10% Sn, 0-5% Ni, 0-3% each of Si, Mn, Li, and Ge, and the balance copper in an amount of at least 21.7%.

According to one embodiment of the invention, a brazing alloy is provided in the form of a preform, comprising, in weight percent: 3-7.5% P, 0.6-1.9% Zn, 0-74.7% Ag, 0-80% Au, 0-10% Sn, 0-5% Ni, and the balance copper in an amount of at least 21.7%.

According to one embodiment of the invention, a method of torch brazing is provided, comprising:

forming a wire or rod from an alloy comprising, in weight percent: 3-7.5% P, 0.6-1.9% Zn, 0-74.7% Ag, 0-80% Au, 0-10% Sn, 0-5% Ni, and the balance copper in an amount of at least 21.7%;

placing a tip of the wire or rod in contact with a surface of a joint formed by first and second base metals, wherein the first base metal is a ferrous alloy, nickel, a nickel alloy, gold, a gold alloy, silver or a silver alloy, and wherein the second base metal is a ferrous alloy, nickel, a nickel alloy, gold, a gold alloy, silver, a silver alloy, copper or a copper alloy; and heating the joint surface using a torch flame and contacting the tip of the wire or rod to the heated joint surface to melt and flow the alloy onto the joint surface and into the joint under capillary action.

According to a further embodiment of the invention, the method further comprises removing the tip from contact with the surface, and then repeating the placing and heating one or more times.

According to one embodiment of the invention, a method of torch brazing is provided, comprising:

forming a wire or rod from an alloy consisting essentially of, in weight percent: 3-7.5% P, 0.6-1.9% Zn, 0-74.7% Ag, 0-80% Au, 0-10% Sn, 0-5% Ni, and the balance copper in an amount of at least 21.7%;

placing a tip of the wire or rod in contact with a surface of a joint formed by first and second base metals, wherein the first base metal is a ferrous alloy, nickel, a nickel alloy, gold, a gold alloy, silver or a silver alloy, and wherein the second base metal is a ferrous alloy, nickel, a nickel alloy, gold, a gold alloy, silver, a silver alloy, copper or a copper alloy; and heating the joint surface using a torch flame and contacting the tip of the wire or rod to the heated joint surface to melt and flow the alloy onto the joint surface and into the joint under capillary action.

According to one embodiment of the invention, a method of brazing is provided, comprising:

forming a preform from an alloy comprising, in weight percent: 3-7.5% P, 0.6-1.9% Zn, 0-74.7% Ag, 0-80% Au, 0-10% Sn, 0-5% Ni, and the balance copper in an amount of at least 21.7%;

placing the preform in contact with the surfaces of a joint formed by first and second base metals, wherein the first base metal is a ferrous alloy, nickel, a nickel alloy, gold, a gold alloy, silver or a silver alloy, and wherein the second base metal is a ferrous alloy, nickel, a nickel alloy, gold, a gold alloy, silver, a silver alloy, copper or a copper alloy; and heating the joint surface to melt and flow the alloy into the joint.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A brazing alloy in the form of a wire, rod or preform, comprising, in weight percent: 3-7.5% P, 0.1-1.9% Zn, 5-18% Ag, 0-80% Au, 0-10% Sn, 0-5% Ni, and the balance copper in an amount of at least 21.7%.

2. The brazing alloy of claim 1, wherein the Zn is present in an amount of 0.6-1.9%.

3. The brazing alloy of claim 2, in the form of a wire or rod.

4. The brazing alloy of claim 3, consisting essentially of 3-7.5% P, 0.6-1.9% Zn, 5-18% Ag, 0-80% Au, 0-10% Sn, 0-5% Ni, 0-3% each of Si, Mn, Li, and Ge, and the balance copper in the amount of at least 21.7%.

5. The brazing alloy of claim 3, consisting essentially of 3-7.5% P, 0.6-1.9% Zn, 5-18% Ag, 0-10% Sn, 0-5% Ni, and the balance copper in an amount of at least 54.4%.

6. The brazing alloy of claim 3, wherein the balance of copper is at least 54.4%.

7. The brazing alloy of claim 6, wherein the Zn is present in an amount of 0.7-1%.

8. The brazing alloy of claim 6, wherein the Sn is present in an amount of 0.5-10% and the Zn is present in an amount of 0.6-1%.

9. A method of torch brazing, comprising:
   forming a wire or rod from an alloy comprising, in weight percent: 3-7.5% P, 0.6-1.9% Zn, 5-18% Ag, 0-80% Au, 0-10% Sn, 0-5% Ni, and the balance copper in an amount of at least 21.7%;
   placing a tip of the wire or rod in contact with a surface of a joint formed by first and second base metals, wherein the first base metal is a ferrous alloy, nickel, or a nickel alloy, and wherein the second base metal is a ferrous alloy, nickel, a nickel alloy, gold, a gold alloy, silver, a silver alloy, copper, or a copper alloy; and
   heating the joint surface using a torch flame and contacting the tip of the wire or rod to the heated joint surface to melt and flow the alloy onto the joint surface and into the joint under capillary action.

10. The method of claim 9, further comprising removing the tip from contact with the surface, and then repeating the placing and heating one or more times.

11. The method of claim 9, wherein the alloy consists essentially of, in weight percent: 3-7.5% P, 0.6-1.9% Zn, 5-18% Ag, 0-80% Au, 0-10% Sn, 0-5% Ni, and the balance copper in an amount of at least 21.7%.

12. The method of claim 9, wherein the alloy consists essentially of, in weight percent: 3-7.5% P, 0.6-1.9% Zn, 5-18% Ag, 0-10% Sn, 0-5% Ni, and the balance copper in an amount of at least 54.4%.

13. The method of claim 12, wherein the Zn is present in an amount of 0.7-1%.

14. The method of claim 12, wherein the Sn is present in an amount of 0.5-10% and the Zn is present in an amount of 0.6-1%.

15. A method of brazing, comprising:
   forming a preform from an alloy comprising, in weight percent: 3-7.5% P, 0.1-1.9% Zn, 5-18% Ag, 0-80% Au, 0-10% Sn, 0-5% Ni, and the balance copper in an amount of at least 21.7%;
   placing the preform in contact with the surfaces of a joint formed by first and second base metals, wherein the first base metal is a ferrous alloy, nickel, or a nickel alloy, and wherein the second base metal is a ferrous alloy, nickel, a nickel alloy, gold, a gold alloy, silver, a silver alloy, copper, or a copper alloy; and
   heating the joint surface to melt and flow the alloy into the joint.

16. The method of claim 15, wherein the alloy consists essentially of, in weight percent: 3-7.5% P, 0.6-1.9% Zn, 5-18% Ag, 0-80% Au, 0-10% Sn, 0-5% Ni, and the balance copper in an amount of at least 21.7%.

17. The method of claim 15, wherein the alloy consists essentially of, in weight percent: 3-7.5% P, 0.6-1.9% Zn, 5-18% Ag, 0-10% Sn, 0-5% Ni, and the balance copper in an amount of at least 54.4%.

* * * * *